United States Patent
Zhang et al.

(10) Patent No.: US 12,158,741 B2
(45) Date of Patent: Dec. 3, 2024

(54) SELF-ADAPTIVE TEST METHOD FOR INTELLIGENT PREDICTION ALGORITHM OF ANALOG MEASURED VALUES

(71) Applicant: CSG POWER GENERATION CO., LTD., Guangzhou (CN)

(72) Inventors: Hao Zhang, Guangzhou (CN); Man Chen, Guangzhou (CN); Yu Gong, Guangzhou (CN); Yumin Peng, Guangzhou (CN); Xiong Dai, Guangzhou (CN); Mingxuan Yang, Guangzhou (CN); Xiaobo Qiu, Guangzhou (CN); Mingliang Yao, Guangzhou (CN); Yaxiong Yu, Guangzhou (CN); Jun She, Guangzhou (CN); Rufei He, Guangzhou (CN); Yanming Gao, Guangzhou (CN); Zhenglin Xiang, Guangzhou (CN); Jianqiu Li, Guangzhou (CN); Dehua Li, Guangzhou (CN); Xianbin Guo, Guangzhou (CN); Xiaoyi Wang, Guangzhou (CN)

(73) Assignee: CSG POWER GENERATION CO., LTD., Guangzhou (CN)

( * ) Notice: Subject to any disclaimer, the term of this patent is extended or adjusted under 35 U.S.C. 154(b) by 454 days.

(21) Appl. No.: 17/613,808

(22) PCT Filed: Sep. 30, 2020

(86) PCT No.: PCT/CN2020/119659
§ 371 (c)(1),
(2) Date: Nov. 23, 2021

(87) PCT Pub. No.: WO2021/238013
PCT Pub. Date: Dec. 2, 2021

(65) Prior Publication Data
US 2022/0317646 A1    Oct. 6, 2022

(51) Int. Cl.
*G05B 19/042* (2006.01)

(52) U.S. Cl.
CPC .. *G05B 19/0428* (2013.01); *G05B 2219/2639* (2013.01)

(58) Field of Classification Search
CPC ........ G05B 19/0428; G05B 2219/2639; G05B 19/042; G06Q 10/04; G06Q 10/06393; G06Q 50/06
See application file for complete search history.

(56) References Cited

U.S. PATENT DOCUMENTS

| 11,403,544 B1 * | 8/2022 | Hermoni | G06N 20/00 |
| 11,886,154 B2 * | 1/2024 | Mukund | C10B 41/00 |

(Continued)

FOREIGN PATENT DOCUMENTS

| CN | 103633739 A | 3/2014 |
| CN | 105069690 A | 11/2015 |

(Continued)

OTHER PUBLICATIONS

International Search Report for Application No. PCT/CN2020/119659 dated Feb. 25, 2021, 5 pages.
Written Opinion for Application No. PCT/CN2020/119659 dated Feb. 25, 2021, 3 pages.

*Primary Examiner* — Thomas C Lee
*Assistant Examiner* — Tyler Dean Hedrick
(74) *Attorney, Agent, or Firm* — Taft Stettinius & Hollister LLP

(57) ABSTRACT

The present disclosure provides a self-adaptive test method for an intelligent prediction algorithm of analog measured values. Firstly, an event recording sequence, an analog measurement point ID and an analog measurement point alarm value are read from a time sequence event record table, an analog measurement point table and an alarm threshold table. Next, operation records of a normal opera- (Continued)

tion state of a unit within a statistical cycle are acquired to form historical statistics of measured values of the analog measurement point based on switching value signals. Then, simulated measured values of the analog measurement point with time scales are calculated based on the historical statistics, the analog measurement point alarm value and an analog measurement point current measured value. Finally, sensitivity is calculated; and an alarm is sent to remind a technician to adjust the algorithm when the sensitivity is greater than a threshold.

3 Claims, 2 Drawing Sheets

(56) References Cited

U.S. PATENT DOCUMENTS

| | | | |
|---|---|---|---|
| 2017/0133849 A1 | 5/2017 | Feng et al. | |
| 2017/0270543 A1* | 9/2017 | Dwivedi | G06Q 10/067 |
| 2018/0060759 A1* | 3/2018 | Chu | G06N 20/00 |
| 2021/0349453 A1* | 11/2021 | Schlake | G05B 19/41885 |
| 2022/0343221 A1* | 10/2022 | Cook | G06N 20/20 |

FOREIGN PATENT DOCUMENTS

| | | |
|---|---|---|
| CN | 107944633 A | 4/2018 |
| CN | 109524139 A | 3/2019 |

* cited by examiner

SELF-ADAPTIVE TEST METHOD FOR INTELLIGENT PREDICTION ALGORITHM OF ANALOG MEASURED VALUES

CROSS REFERENCE TO RELATED APPLICATIONS

This is a U.S. National Stage application of, and claims priority to, PCT/CN2020/119659, filed Sep. 30, 2020, which further claims priority to Chinese Patent Application No. 202010457983.7, filed May 26, 2020, the disclosures of which are incorporated herein by reference in their entirety.

TECHNICAL FIELD

The present disclosure relates to the field of electrical equipment technologies, and in particular, to a self-adaptive test method for an intelligent prediction algorithm of analog measured values.

BACKGROUND

A power plant attendant is required to monitor more than 500 analog measurement points with a trip outlet function to monitor a panel. The analog measurement points with the trip outlet function are distributed in different simulation diagrams of a master computer of a monitoring system. It is impossible to find an abnormality in advance by manually tracking a change trend by an attendant. At present, intelligent technologies such as machine learning and the like are increasingly developed, and the intelligent technologies provide important technical means for trend judgment and prediction.

However, it is not negligible that such intelligent technologies rely on fault samples, and a large number of fault samples are required to participate in an algorithm training process to ensure a good implementation effect. Fault sample data is less in the operation and maintenance of a power plant with a mature technology. In addition, there is a lack of a test method for verifying implementation effects of the intelligent technologies. Application effects of the intelligent technologies stay in subjective fuzzy understanding, and even stay in the disposal of accidental events.

In the past, the acquisition of fault samples comes from debugging and troubleshooting after overhaul, and the acquisition of the fault samples is costly. In addition, numerical characteristics of the fault samples cannot completely cover trend characteristics under fault conditions, which have some limitations. Therefore, means for testing performance of an intelligent trend judgment algorithm and a method for providing fault samples for the intelligent trend judgment algorithm are urgently needed at present.

SUMMARY

The present disclosure provides a self-adaptive test method for an intelligent prediction algorithm of analog measured values, which may test an implementation effect of an intelligent prediction algorithm of analog measured values of a start-up state of a unit based on historical operating conditions, alarm thresholds and switching value signals, so as to automatically perform self-adaptive adjustment according to the historical operating conditions of the unit for testing, so that the obtaining of fault samples and the testing of the implementation effect of the intelligent technology can be solved better, faster and more economically through a computer.

The present disclosure provides a self-adaptive test method for an intelligent prediction algorithm of analog measured values, including the following steps:

(1.1) reading an event recording sequence, an analog measurement point ID and an analog measurement point alarm value from a time sequence event record table, an analog measurement point table and an alarm threshold table;

(1.2) acquiring operation records of a normal operation state of a unit within a statistical cycle to form historical statistics of measured values of an analog measurement point based on switching value signals;

(1.3) calculating simulated measured values of the analog measurement point with time scales based on the historical statistics, the analog measurement point alarm value and an analog measurement point current measured value;

(1.4) providing the simulated measured values of the analog measurement point with time scales for the intelligent prediction algorithm of analog measured values of a start-up state of the unit for testing, and calculating sensitivity; and (1.5) sending an alarm to remind a technician to adjust the algorithm when the sensitivity is less than a threshold.

In the method, the time sequence event record table is a switching value signal set K with a time record, a state record and equipment description set in sequence by a technician, the switching value signal set K including at least a unit starting command signal, a unit steady-state signal and a unit-load to base-load signal; the analog measurement point table is a to-be-tested analog measurement point ID set M set by an attendant; and the alarm threshold table is an analog measurement point first-level alarm set $B_1$ and an analog measurement point second-level alarm set $B_2$.

In the method, the historical statistics of the measured values of the analog measurement point based on the switching value signals is obtained through the following steps:

(3.1) traversing switching value records in the statistical cycle, taking out switching value signals simultaneously satisfying the switching value signal set K in sequence, and storing a time of the switching value signals taken out in a time sequence TL according to the sequence of the switching value signal set K;

(3.2) traversing analog records of the analog measurement point ID set M in the statistical cycle, and taking out a maximum value of measured values of measurement point of the analog measurement point set M with a time scale of the time sequence TL to obtain a measured value set CL of the measurement point; and (3.3) the measured value set CL of the measurement point being the historical statistics of the measured values of the analog measurement point based on the switching value signals.

In the method, the calculating simulated measured values of the analog measurement point with time scales based on the historical statistics, the analog measurement point alarm value and an analog measurement point current measured value involves the following steps (4.1) acquiring an average value maxave from the measured value set CL of the measurement point, and acquiring, from the alarm threshold table, a first-level alarm value $b_1$ and a second-level alarm value $b_2$ of a measurement point of the present unit;

(4.2) calculating a stacking slope $k_1$, the stacking slope $k_1=b_1/maxave-1$, and calculating a stacking slope $k_2$, the stacking slope $k_2=b_2/maxave-1$;

(4.3) setting i=1, a test sample number being yb, and a tolerance $d=(k_2-k_1)/yb$;
(4.4) calculating $tmp1=k_1+(i-1)\times d$;
(4.5) when i is not greater than yb, storing tmp1 in a vector k(i), i=i+1, performing step (4.4); when i is greater than yb, performing step (4.6); and
(4.6) adding 0.01 to each element in the vector k(i) to obtain a superposition stacking slope vector k;
(4.7) acquiring a time $T_1$ of the unit starting command signal and a time $T_3$ of the unit-load to base-load signal in the switching value signal set K;
(4.8) setting i=1;
(4.9) acquiring an actually measured analog measured value with the time scale as x(t), before the time $T_1$, y(t)=x(t), between $T_1$ and $T_2$, $y(t)=x(t)\times(1+k(i))$, and after the time $T_3$, $y(t)=x(t)+(y(T_3)-x(T_3))$;
(4.10) when i is not greater than yb, transposing a column vector y to a matrix yy, i=i+1, and performing step (4.9); when i is greater than yb, performing step (4.11); and
(4.11) the matrix yy being the simulated measured values with time scale of the analog measurement point.

In the method, the sensitivity is calculated through the following steps:
(5.1) acquiring the test sample number yb;
(5.2) acquiring the time $T_1$ of the unit starting command signal, the time $T_2$ of the unit steady-state signal and the time $T_3$ of the unit-load to base-load signal in the switching value signal set K, i=1, and f=0;
(5.3) providing the simulated measured values yy(i,:) of the analog measurement point with time scales t for the intelligent prediction algorithm of analog measured values of the start-up state of the unit for testing, and if a testing algorithm finds a fault before the time $T_2$ f=f+1;
(5.4) when i is not greater than yb, i=i+1, performing step (5.3); when i is greater than yb, performing step (5.5); and
(5.5) the sensitivity $L=f/yb\times 100\%$.

In the method, the threshold δ is 50%.

Compared with the prior art, the present disclosure fills the blank of the engineering field and has the following beneficial effects:

(1) The present disclosure provides a standardized test method for an intelligent prediction algorithm of analog measured values of a start-up state of a unit. The test method according to the present disclosure can completely cover trend characteristics under fault conditions, and break the limitations of the original dependence on actually measured fault samples.

(2) The present disclosure may automatically perform self-adaptive adjustment according to historical operating conditions of the unit to meet test requirements, so that the obtaining of fault samples and the testing of the implementation effect of the intelligent technology can be solved better, faster and more economically through a computer.

(3) The present disclosure quantitatively evaluates the implementation effect of the intelligent technology, provides index support for parameter adjustment of the intelligent technology, the selection of a proper algorithm and implementation means, also realizes the advance of the verification of the implementation effect of the intelligent technology, and prevents losses and uncertain influence caused by the verification through actual engineering.

DETAILED DESCRIPTION OF THE EMBODIMENTS

Specific implementations of the present disclosure are further described below with reference to the accompanying drawings and examples, but implementation and protection of the present disclosure are not limited thereto. It is to be noted that if any of the following processes is not described in detail, they may be realized or understood by those skilled in the art with reference to the prior art.

The present disclosure performs standardization in combination with engineering experience, and provides a test method for testing an intelligent prediction algorithm of analog measured values of a start-up state of unit based on historical operating conditions, alarm thresholds and switching value signals. In addition, the present disclosure may automatically perform self-adaptive adjustment according to historical operating conditions of the unit to meet test requirements, so that the obtaining of fault samples and the testing of the implementation effect of the intelligent technology can be solved better, faster and more economically through a computer.

The following is an example analysis on monitoring signals for starting of a power generation condition of a #4 unit in Guangzhou Energy Storage Hydropower Plant from 11:00 to 19:00 on Apr. 10, 2019.

Figure 1:
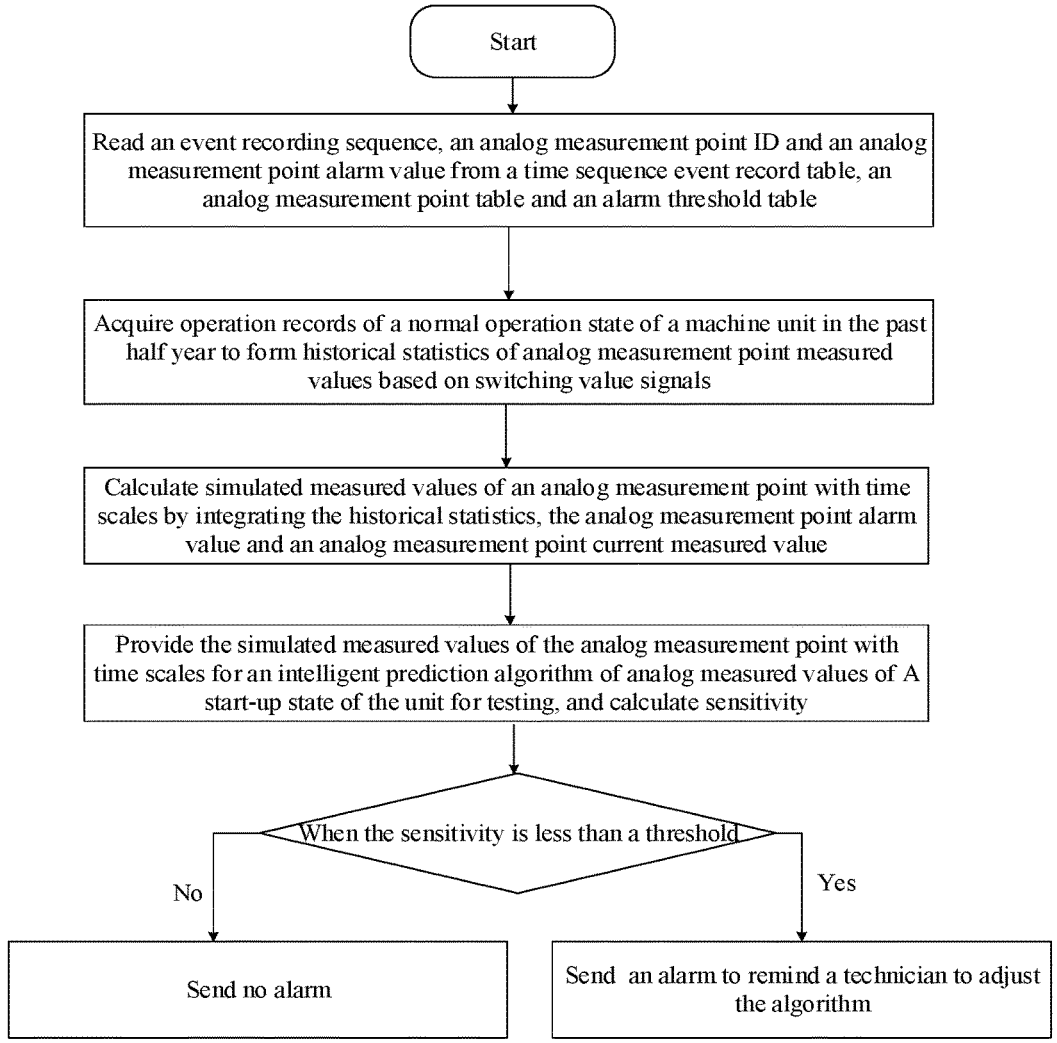
FIG. 1 is a flowchart of a self-adaptive test method for an intelligent prediction algorithm of an analog measured value according to an embodiment of the present disclosure.

With reference to the flow in FIG. 1, a self-adaptive test method for an intelligent prediction algorithm specifically for testing analog measured values of a start-up state of a unit includes the following steps.

(1.1) An event recording sequence, an analog measurement point ID and an analog measurement point alarm value are read from a time sequence event record table (Table 1 below), an analog measurement point table (Table 2 below) and an alarm threshold table (Table 3 below). The time sequence event record table is a switching value signal set K with a time record, a state record and equipment description set in sequence by a technician. The switching value signal set K includes at least a unit starting command signal, a unit steady-state signal and a unit-load to base-load signal. The analog measurement point table is a to-be-tested analog measurement point ID set M set by an attendant. The alarm threshold table is an analog measurement point first-level alarm set B1 and an analog measurement point second-level alarm set B2.

TABLE 1

| Time sequence event record table | | | |
|---|---|---|---|
| Serial number | Switching value signal | Event description | State |
| 1 | $K_1$ | Unit starting signal | Has been started up |
| 6 | $K_6$ | Signal indicating that a working condition of the unit reaches a steady state | Has reached a steady state |

TABLE 2

Analog measurement point table

| Analog signal | Analog measurement point ID | Analog measurement point short name | Description |
|---|---|---|---|
| $M_1$ | 3088226 | 04GTASMS4 | bush temperature 7 of upper guide bearing of Unit 4_SMS4_in Guangzhou Energy Storage Hydropower Plant A |

TABLE 3

Alarm threshold table

| Serial number | Analog measurement point short name | First-level alarm value $B_1$ | Second-level alarm value $B_2$ |
|---|---|---|---|
| 1 | 04GTASMS4 | 75° C. | 80° C. |

(1.2) Operation records of a normal operation state of a unit within a statistical cycle are acquired to form historical statistics of measured values of the analog measurement point based on switching value signals. In the present embodiment, the statistical cycle is the past half year.

The historical statistics is obtained through the following steps. Switching value records in the past half year are traversed, switching value signals simultaneously satisfying the switching value signal set K in sequence are taken out, and the time of the switching value signals taken out is stored in a time sequence TL according to the sequence of the switching value signal set K.

Analog records of the analog measurement point ID set M in the past half year are traversed, and a maximum value of measured values of the measurement point of the analog measurement point set M with a time scale of the time sequence TL is taken out to obtain a measured value set CL of the measurement point.

The measured value set CL of the measurement point is the historical statistics of the point measured values of the analog measurement (Table 4 below) based on the switching value signals.

TABLE 4

Historical statistics of measurement point

| measured value set of the measurement point | Average value maxave of the measured value set CL of the measurement point |
|---|---|
| CL | 60.7° C. |

(1.3) Simulated measured values of the analog measurement point with time scales are calculated based on the historical statistics, the analog measurement point alarm value and an analog measurement point current measured value, which involves the following specific steps.

(1.3a) An average value maxave is acquired from the measured value set CL of the measurement point, and a first-level alarm value $b_1$ and a second-level alarm value $b_2$ of a measurement point of the present unit are acquired from the alarm threshold table.

(1.3b) A stacking slope $k_1$ is calculated, the stacking slope $k_1=b_1/\text{maxave}-1$, and a stacking slope $k_2$ is calculated, the stacking slope $k_2=b_2/\text{maxave}-1$.

In the present embodiment, the calculated stacking slope $k_1=b_1/\text{maxave}-1=75/60.7-1=0.2356$, and the stacking slope $k_2=b_2/\text{maxave}-1=80/60.7-1=0.3180$.

(1.3c) $i=1$, i denotes an $i^{th}$ out-of-limit test sample of the measurement point, a test sample number is yb, and a tolerance $d=(k_2-k_1)/\text{yb}$.

(1.3d) $tmp1=k_1+(i-1)\times d$ is calculated, and tmp1 indicates that a measured value of the measurement point can be out of limit by superposing a change speed of tmp1 on the basis of a maximum average measured value of the measurement point.

(1.3e) When i is not greater than yb, tmp1 is stored in a vector k(i), the vector k(i) denotes a superposition change speed of the measured value of the $i^{th}$ out-of-limit test sample of the measurement point, $i=i+1$, and step (4.4) is performed; when i is greater than yb, step (4.6) is performed.

$i=1$, $tmp1=k_1+(i-1)\times d=0.2356$, $k(1)=0.2356$;
$i=2$, $tmp1=k_1+(i-1)\times d=0.2356+1\times 0.0165$, $k(2)=0.2521$;
$i=3$, $tmp1=k_1+(i-1)\times d=0.2356+2\times 0.0165$, $k(3)=0.2521$;
$i=4$, $tmp1=k_1+(i-1)\times d=0.2356+3\times 0.0165$, $k(4)=0.2521$;
$i=5$, $tmp1=k_1+(i-1)\times d=0.2356+4\times 0.0165$, $k(5)=0.3015$;
$k(i)=[0.2356, 0.2521, 0.2521, 0.2521, 0.30151]^T$ (1.3f) 0.01 is added to each element in the vector k(i) to obtain a superposition stacking slope vector k, $i\in[1, yb]$.
$k=k(i)+0.01$
$k=[0.2456, 0.2621, 0.2785, 0.2950, 0.31151]^T$ (1.3g) Time $T_1$ of the unit starting command signal and time $T_3$ of the unit-load to base-load signal in the switching value signal set K are acquired. In the present embodiment, the time of the unit starting command signal is $T_1=$2019-04-10 11:13:22, which corresponds to the numerical time 737525.46 in FIG. 2. The time of the unit-load to base-load signal is $T_3=$2019-04-10 18:15:30, which corresponds to the numerical time 737525.76 in the figure.

(1.3h) $i=1$.

(1.3i) An actually measured analog measured value with the time scale is acquired as x(t); before time $T_1$, $y(t)=x(t)$; between $T_1$ and $T_2$, $y(t)=x(t)\times(1+k(i))$; and after the time $T_3$, $y(t)=x(t)+(y(T_3)-x(T_3))$. $T_2$ represents time of the unit steady-state signal. The time of the unit steady-state signal in the present embodiment is $T_2=$2019-04-10 11:17:06, which corresponds to the numerical time 737525.47 in FIG. 2.

(1.3j) When i is not greater than yb, a column vector y is transposed to a matrix yy, $i=i+1$, and step (4.9) is performed; when i is greater than yb, step (4.11) is performed.

(1.3k) The matrix yy(i,:) is the simulated measured values of the analog measurement point with time scales.

When $i=1$,
$y(T_3)=75.53$; $x(T_3)=60.7$;
before the time $T_1$, $y(t)=x(t)$,
between $T_1$ and $T_2$, $y(t)=x(t)\times(1+0.2456)$
after the time $T_3$, $y(t)=x(t)+14.833$.
yy(1,:) is a combination of each y(t) after $T_1$ to $T_3$.

When $i=2$,
$y(T_3)=76.53$; $x(T_3)=60.70$;
before the time $T_1$, $y(t)=x(t)$ prior to,
between $T_1$ and $T_2$, $y(t)=x(t)\times(1+0.2621)$
after the time $T_3$, $y(t)=x(t)+15.828$.
yy(2,:) is a combination of each y(t) after $T_1$ to $T_3$.

When $i=3$,
$y(T_3)=77.52$; $x(T_3)=60.70$;
before the time $T_1$, $y(t)=x(t)$, between $T_1$ and $T_2$, $y(t)=x(t)\times(1+0.2785)$
after the time $T_3$, $y(t)=x(t)+16.823$.
yy(3,:) is a combination of each y(t) after $T_1$ to $T_3$.
When i=4,
  $y(T_3)=78.52$; $x(T_3)=60.70$;
  before the time $T_1$, $y(t)=x(t)$
  between $T_1$ and $T_2$, $y(t)=x(t)\times(1+0.2950)$
  after the time $T_3$, $y(t)=x(t)+17.818$.
yy(4,:) is a combination of each y(t) after $T_1$ to $T_3$.
When i=5,
  $y(T_3)=79.51$; $x(T_3)=60.70$;
  before the time $T_1$, $y(t)=x(t)$,
  between $T_1$ and $T_2$, $y(t)=x(t)\times(1+0\ 0.3115)$
  after the time $T_3$, $y(t)=x(t)+18.814$.
yy(5,:) is a combination of each y(t) after $T_1$ to $T_3$.

(1.4) The simulated measured values of the analog measurement point with time scales are provided for an intelligent prediction algorithm of measured values of a start-up state analog of the unit for testing, and sensitivity is calculated.

Figure 2:
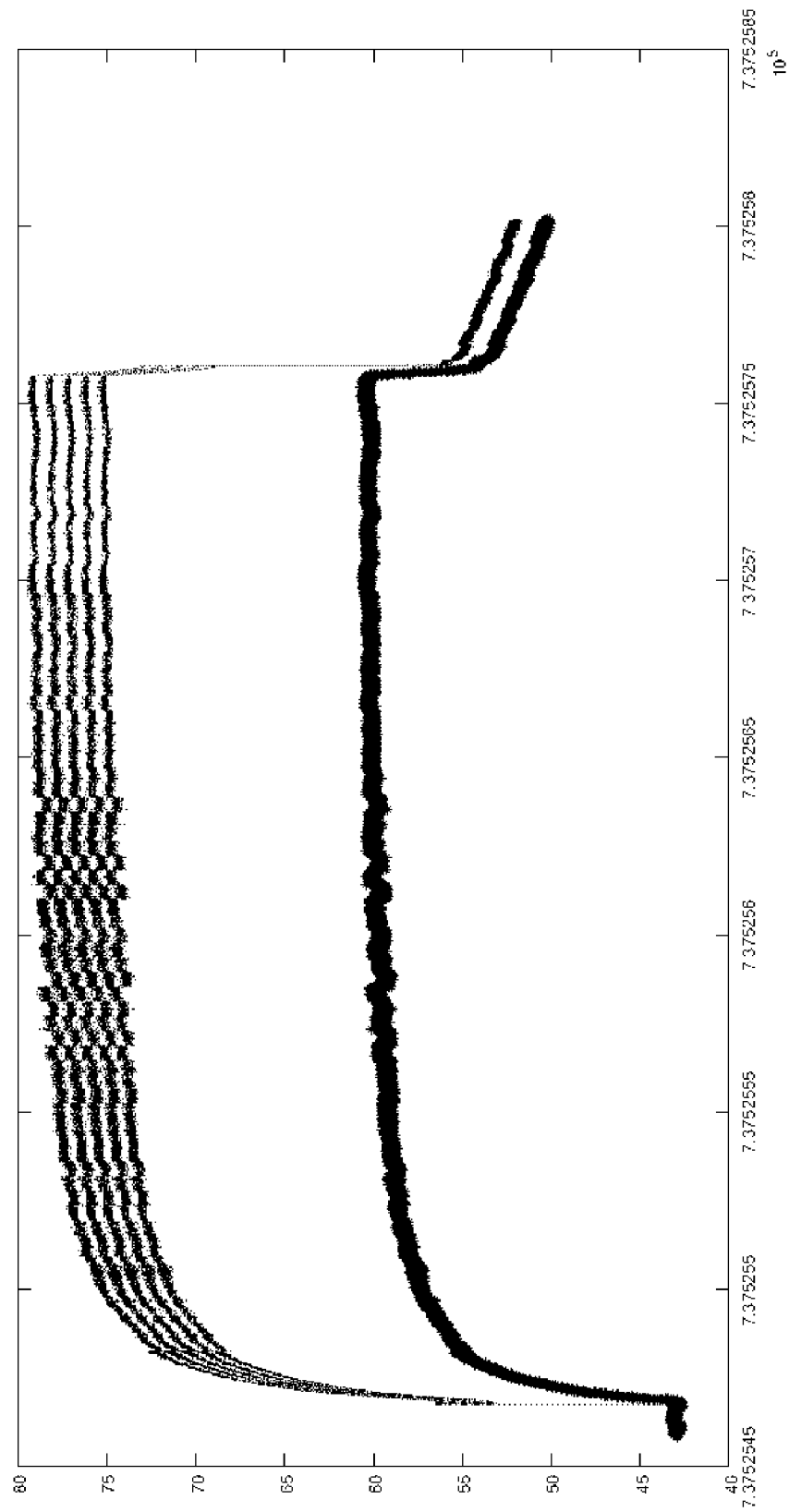
FIG. 2 is a schematic diagram of simulated measured values and actual measured original values measured by analog quantity according to an embodiment of the present disclosure.

As shown in FIG. 2, a thick-solid-line curve is actual measured original values of the analog measurement point, and a thin-dotted-line curve is simulated measured values of the analog measurement point with time scales. The simulated measured values of the analog measurement point with time scales are provided for the intelligent prediction algorithm of analog measured values of the start-up state of the unit for testing.

In the present embodiment, a fault is found prior to the time $T_2$, where f=4 and yb=5, and the sensitivity is L=f/yb×100%=80%.

(1.5) An alarm is sent to remind a technician to adjust the algorithm when the sensitivity is less than a threshold.

In the present embodiment, the threshold δ is 50%.

In the present embodiment, the sensitivity L is not less than the threshold, and there is no need to send an alarm to remind the technician to adjust the algorithm.

CONCLUSIONS

Therefore, the present disclosure provides a standardized test method for testing an intelligent prediction algorithm of analog measured values of a start-up state of a unit. The testing according to the present disclosure can completely cover trend characteristics under fault conditions, and break the limitations of the original dependence on actually measured fault samples. Self-adaptive adjustment may be automatically performed according to historical operating conditions of the unit so as to meet test requirements, so that the work of obtaining fault samples and testing the implementation effect of the intelligent technology can be solved better, faster and more economically through a computer. At the same time, the implementation effect of the intelligent technology is also quantitatively evaluated, which provides index support for parameter adjustment of the intelligent technology, the selection of a proper algorithm and implementation means, also realizes the advance of the verification of the implementation effect of the intelligent technology, and prevents losses and uncertain influence caused by the verification through actual engineering.

What is claimed is:

1. A self-adaptive test method for testing an implementation effect of an intelligent prediction algorithm of analog measured values of a unit, the self-adaptive test method comprising the following steps:

(1.1) reading an event recording sequence from a time sequence event record table, an analog measurement point ID from an analog measurement point table, and an analog measurement point alarm value from an alarm threshold table, wherein:
  the time sequence event record table is a switching value signal set K with a time record, a state record and equipment description set in sequence, the switching value signal set A includes at least a unit starting command signal, a unit steady-state signal and a unit-load to base-load signal,
  the analog measurement point table is a to-be-tested analog measurement point ID set M, and
  the alarm threshold table is an analog measurement point first-level alarm set $B_1$ and an analog measurement point second-level alarm set $B_2$;

(1.2) acquiring operation records of a normal operation state of the unit within a statistical cycle to form historical statistics of measured values of an analog measurement point based on switching value signals, wherein the historical statistics of measured values of the analog measurement point based on switching value signals is obtained through the following steps:

(1.2a) traversing switching value records in the statistical cycle, taking out switching value signals simultaneously satisfying the switching value signal set K in sequence, and storing a time of the switching value signals taken out in a time sequence TL according to the sequence of the switching value signal set K;

(1.2b) traversing analog records of the analog measurement point ID set M in the statistical cycle, and taking out a maximum value of measured values of the measurement point of the analog measurement point set M with a time scale of the time sequence TL to obtain a measured value set CL of the measurement point; and (1.2c) regarding the measured value set CL of the measurement point as the historical statistics of measured values of the analog measurement point based on switching value signals;

(1.3) calculating simulated measured values of the analog measurement point with time scales based on the historical statistics, the analog measurement point alarm value and an analog measurement point current measured value, including the following steps:

(1.3a) acquiring an average value maxave from the measured value set CL of the measurement point, and acquiring, from the alarm threshold table, a first-level alarm value $b_1$ and a second-level alarm value $b_2$ of a measurement point of the present unit;

(1.3b) calculating a stacking slope $k_1$, the stacking slope $k_1=b_1$/maxave−1, and calculating a stacking slope $k_2$, the stacking slope $k_2=b_2$/maxave−1;

(1.3c) setting i=1, i denoting an $i^{th}$ out-of-limit test sample of the measurement point, a test sample number being yb, and a tolerance d=$(k_2-k_1)$/yb;

(1.3d) calculating tmp1=$k_1$+(i−1)×d, tmp1 indicating that a measured value of the measurement point is out-of-limit by superposing a change speed of tmp1 on the basis of a maximum average measured value of the measurement point;

(1.3e) when i is not greater than yb, storing tmp1 in a vector k(i), the vector k(i) denoting a superposition change speed of the measured value of the $i^{th}$ out-of-limit test sample of the measurement point, i=i+1, performing step (1.3d); when i is greater than yb, performing step (1.3f);

(1.3f) adding 0.01 to each element in the vector k(i) to obtain a superposition stacking slope vector k, i∈[1, yb];

(1.3g) acquiring a time $T_1$ of the unit starting command signal and a time $T_3$ of the unit-load to base-load signal in the switching value signal set K;

(1.3h) setting i=1;

(1.3i) acquiring an actually measured analog measured value with the time scale as x(t), before the time $T_1$, y(t)=x(t), between $T_1$ and $T_2$, y(t)=x(t)×(1+k(i)), after a time $T_2$, y(t)=x(t)+(y(T3)−x(T3)), wherein $T_2$ represents a time of the unit steady-state signal, and y(t) represents a simulation test measured value of the measurement point;

(1.3j) when i is not greater than yb, transposing a column vector y to a matrix yy, i=i+1, and performing step (1.3i); when i is greater than yb, performing step (1.3k); and (1.3k) regarding the matrix yy(i,:) as the simulated measured values of the analog measurement point with time scales;

(1.4) providing the simulated measured values of the analog measurement point with time scales for the intelligent prediction algorithm of analog measured values of a start-up state of the unit for testing, and calculating sensitivity; and (1.5) sending an alarm to remind a technician to adjust the algorithm when the sensitivity is less than a threshold.

2. The self-adaptive test method according to claim 1, wherein in step (1.4), the sensitivity is calculated through the following steps:

(5.1) acquiring the test sample number yb;

(5.2) acquiring the time $T_1$ of the unit starting command signal, the time $T_2$ of the unit steady-state signal and the time $T_3$ of the unit-load to base-load signal in the switching value signal set K, i=1, and a fault f=0;

(5.3) providing the simulated measured values yy(i,:) of the analog measurement point with time scales t for the intelligent prediction algorithm of analog measured values of the start-up state of the unit for testing, and if a testing algorithm finds a fault before the time $T_2$, f=f+1;

(5.4) when i is not greater than yb, i=i+1, performing step (5.3); when i is greater than yb, performing step (5.5); and (5.5) the sensitivity L=f/yb×100%.

3. The self-adaptive test method according to claim 1, wherein in step (1.5), the threshold is 50%.

* * * * *